United States Patent [19]

Gamo et al.

[11] Patent Number: 5,441,715

[45] Date of Patent: Aug. 15, 1995

[54] METHOD FOR THE SEPARATION OF HYDROGEN ISOTOPES USING A HYDROGEN ABSORBING ALLOY

[75] Inventors: Takaharu Gamo, Fujiidera; Noboru Taniguchi, Osaka; Junji Niikura, Hirakata; Kazuhito Hatoh, Daito, all of Japan

[73] Assignee: Matsushita Electric Industrial Co., Ltd., Osaka, Japan

[21] Appl. No.: 4,491

[22] Filed: Jan. 14, 1993

Related U.S. Application Data

[62] Division of Ser. No. 857,529, Mar. 25, 1992, abandoned.

[30] Foreign Application Priority Data

Mar. 26, 1991 [JP] Japan .................................. 3-061624
Oct. 8, 1991 [JP] Japan .................................. 3-260035

[51] Int. Cl.⁶ .................................................. C01B 3/04
[52] U.S. Cl. .................................. 423/249; 423/658.2
[58] Field of Search ........................... 423/249, 658.2

[56] References Cited

U.S. PATENT DOCUMENTS

| | | | |
|---|---|---|---|
| 3,620,844 | 11/1971 | Wicke et al. | 423/658.2 |
| 3,716,491 | 2/1973 | Yannopoulas et al. | 252/625 |
| 3,940,912 | 3/1976 | Buchner | 423/658.2 |
| 4,075,312 | 2/1978 | Tanaka et al. | 423/648.1 |
| 4,153,484 | 5/1979 | Gamo et al. | 420/900 |
| 4,160,014 | 7/1979 | Gamo et al. | 420/434 |
| 4,279,700 | 7/1981 | Boyle et al. | 376/418 |
| 4,311,232 | 1/1982 | Klatt et al. | 206/0.7 |
| 4,406,874 | 9/1983 | Wallace et al. | 420/900 |
| 4,468,235 | 8/1985 | Hill | 95/46 |
| 4,489,050 | 12/1984 | van Essen et al. | 420/434 |
| 4,600,660 | 7/1986 | Klatt et al. | 423/644 |
| 4,659,554 | 4/1987 | Levinson et al. | 423/249 |
| 4,783,329 | 11/1988 | Maeland et al. | 423/644 |
| 4,913,879 | 4/1990 | Honda et al. | 420/434 |
| 4,996,020 | 2/1991 | Shimoyashiki et al. | 326/313 |

FOREIGN PATENT DOCUMENTS

51-124690 10/1976 Japan .

OTHER PUBLICATIONS

Lynch et al, "The Titanium-Molybdenum-Hydrogen System: Isotope Effects, Thermodynamics and Phase Changes", pp. 342–365 of Ban (Ed.), i Transition Metal Hydrides, vol. 167 of the *Advances in Chemistry Series*, American Chemical Soc. (1978) Washington D.C. T7).
Y. Osumi, *Hydrogen Absorbing Alloy*, Jun. 1, 1985.
R. Lasser, *Physical Review B*, Sep. 15,1982, vol. 26, No. 6, pp. 3517–3519, "Palladium-tritium system".
J. Tanka et al., *Inorganic Chemistry*, vol. 17, No. 2, 1978, pp. 498–500, "Hydrogen Isotope Effects in Titanium Alloy Hydrides".

*Primary Examiner*—Edward A. Miller
*Attorney, Agent, or Firm*—Panitch Schwarze Jacobs & Nadel

[57] ABSTRACT

A hydrogen absorbing alloy comprising Laves phases with a C14-type crystal structure is provided. The alloy can absorb or release different hydrogen isotopes one after another in accordance with changes In pressure, by utilizing the differences in equilibrium absorption or desorption pressures of the respective hydrogen isotopes. This alloy can be used to effectively separate hydrogen isotopes by utilizing the differences in equilibrium absorption or desorption pressures between the respective hydrogen isotopes, or by utilizing the differences in desorption rates between the hydrogen isotopes.

24 Claims, 5 Drawing Sheets

METHOD FOR THE SEPARATION OF HYDROGEN ISOTOPES USING A HYDROGEN ABSORBING ALLOY

CROSS-REFERENCE TO RELATED APPLICATION

This application is a divisional of U.S. patent application Ser. No. 07/857,529, filed Mar. 25, 1992, now abandoned.

BACKGROUND OF THE INVENTION

1. Field Of the Invention

The present invention relates to a hydrogen absorbing alloy which can absorb and release hydrogen isotopes so as to separate them effectively, and it also relates to a method for the separation of hydrogen isotopes using the hydrogen absorbing alloy.

2. Description of the Prior Art

There are three isotopes of hydrogen: light hydrogen (symbolized: H), deuterium (symbolized: $^2$H or D) and tritium (symbolized: $^3$H or T). Among these hydrogen isotopes, deuterium and tritium are known as heavy hydrogens. The heavy hydrogens and compounds containing them are used for various purposes. For example, they are used as fuels for nuclear fusion, treating media for heavy-water reactors, neutron moderators, baryon beam sources for accelerators, tracers for analysis, and the like. Since light hydrogen and heavy hydrogens are usually present as a mixture, many methods have been developed for separating a heavy hydrogen from a mixture of light and heavy hydrogens. Examples of these methods include: electrolysis of a mixture of water and heavy water, in which the separation of hydrogen isotopes is effected by utilizing the difference in voltage for electrolysis between water and heavy water; a temperature exchange reaction in which a hydrogen exchange reaction is effected between heavy hydrogen sulfide and hydrogen sulfide; hydrogen-water chemical isotope exchange using a hydrophobic platinum catalyst; laser isotope separation which utilizes the difference in decomposition rates between water and heavy water when they are exposed to infrared laser light; distillation of water; distillation of liquid hydrogen; a hydrogen-water isotope exchange reaction, etc. The use of a metal or alloy capable of absorbing hydrogen, i.e., a single metal such as vanadium or a binary alloy such as $TiCr_2$ and TiNi, has also been proposed for the separation of hydrogen isotopes. In the proposed method, the metal or alloy is first allowed to absorb a mixed gas of hydrogen isotopes (e.g., $H_2$ and $D_2$) at a predetermined high pressure (e.g., 10 atmospheric pressure). Then, the pressure is lowered (e.g., 2 to 3 atmospheric pressure) so as to cause the metal or alloy to release only a particular hydrogen isotope of $H_2$, by utilizing the differences in equilibrium desorption pressures between the respective isotopes. In another proposed method, the concentration of a particular hydrogen isotope (e.g. $D_2$) in a mixed gas of hydrogen isotopes (e.g., $H_2$ and $D_2$) is increased through the absorption of the mixed gas by the metal or alloy, by utilizing the differences in absorption rates between the respective hydrogen isotopes (Y. Osumi, Hydrogen Absorbing Alloy; Yonoshobo Ltd., Tokyo, Japan).

Among the above-described conventional methods, the hydrogen-water isotope exchange reaction is widely used. This exchange reaction is expressed by the following reaction formula II:

$$H_2O + HT \rightleftarrows HTO + H_2 \quad \text{(II)}$$
Liquid  Gas       Liquid  Gas In the reaction formula II, the reaction proceeds toward the right at low temperatures, and proceeds toward the left at high temperatures. For example, when a gas containing tritium is allowed to stand in contact with water at a low temperature, tritium can be collected in the form of water of the formula HTO. The dual temperature exchange method and the single temperature exchange method are known as isotope separation processes using this principle.

The conventional methods described above, however, have disadvantages. For example, the temperature exchange method using hydrogen sulfide requires complicated operations for temperature control and usually requires a high temperature of about 200° C. The use of a poisonous substance such as $H_2S$ is another disadvantage of the method. The method also requires large-scale equipment and high cost, and furthermore, involves problems of environmental pollution due to the production of hydrogen sulfide and ammonia. In the above conventional method using the metal or alloy capable of absorbing hydrogen, it is extremely difficult to attain a high concentration of a desired hydrogen isotope because of the small differences in equilibrium desorption pressures between the respective hydrogen isotopes. Thus, the same separation process is required to be repeated over and over again. Such repetition of the same process causes the deterioration of the metal or alloy.

SUMMARY OF THE INVENTION

A hydrogen absorbing alloy of the present invention, which overcomes the above-discussed and numerous other disadvantages and deficiencies of the prior art, comprises Laves phases with a C14-type crystal structure, and can absorb or release different hydrogen isotopes one after another in accordance with changes in pressure, by utilizing the differences in equilibrium absorption or desorption pressures of the respective hydrogen isotopes.

In a preferred embodiment, the hydrogen sorbing alloy is of the following formula I:

$$AB\alpha \quad \text{(I)}$$

wherein A is at least one selected from the group consisting of Ti, Zr and Hf; B is at least one selected from the group consisting of Mn, V, Fe, Ni, Cr, Co, Cs, Zn, Al, Si, Nb, Me, W, Mg, Ca, Y, Ta, Pd, Ag, Au, Cd, In, Sn, Bi, La, Ce, Mm (misch metal), Pt, Nd, Th and Sm; and a is a number in the range of 1.5 to 2.5.

A first method for separating light hydrogen and a heavy hydrogen of the present invention comprises the steps of:

a) allowing a mixed gas of light and heavy hydrogens to contact the above-mentioned hydrogen absorbing alloy at a predetermined temperature and at a pressure lower than the equilibrium absorption pressure of light hydrogen and higher than that of the heavy hydrogen, thereby allowing the hydrogen absorbing alloy to absorb the heavy hydrogen;

b) separating the light hydrogen remaining outside the hydrogen absorbing alloy from the system; and c) maintaining the pressure in the system at a level lower than the equilibrium desorption pressure of the heavy hydrogen so as to allow the hydrogen absorbing alloy to release the heavy hydrogen.

In a preferred embodiment, the first method further comprises the step of repeating steps a to c using a gas obtained in step b or c.

In a preferred embodiment, the heavy hydrogen in the first method is deuterium.

In a preferred embodiment, the heavy hydrogen n the first method is a mixed gas of deuterium and tritium, and the first method further comprises the steps of:

d) allowing the mixed gas of deuterium and tritium obtained in step c to contact the hydrogen absorbing alloy at a predetermined temperature and at a pressure lower than the equilibrium absorption pressure of deuterium and higher than that of tritium, thereby causing the hydrogen absorbing alloy to absorb the tritium;

e) separating the deuterium remaining outside the hydrogen absorbing alloy from the system; and f) maintaining the pressure in the system at a level lower than the equilibrium desorption pressure of tritium so as to allow the hydrogen absorbing alloy to release the tritium.

A second method for separating light hydrogen and a heavy hydrogen of the present invention comprises the steps of;

a) allowing a mixed gas of light and heavy hydrogens to contact the above-mentioned hydrogen absorbing alloy at a predetermined temperature and at a pressure higher than the equilibrium absorption pressure of light hydrogen, thereby allowing the hydrogen absorbing alloy to absorb the light and heavy hydrogens;

b) maintaining the pressure in the system at a level lower than the equilibrium desorption pressure of light hydrogen and higher than that of the heavy hydrogen so as to cause the hydrogen absorbing alloy to release the light hydrogen, and then separating the released light hydrogen from the system; and c) maintaining the pressure in the system at a level lower than the equilibrium desorption pressure of the heavy hydrogen so as to allow the hydrogen absorbing alloy to release the heavy hydrogen.

In a preferred embodiment, the second method further comprises the step of repeating steps a to c using a gas obtained in step b or c.

In a preferred embodiment, the heavy hydrogen the second method is deuterium.

In a preferred embodiment, the heavy hydrogen In the second method is a mixed gas of deuterium and tritium, and the method further comprises the steps of:

d) allowing the mixed gas of deuterium and tritium obtained in step c to contact the hydrogen absorbing alloy at a predetermined temperature and at a pressure higher than the equilibrium absorption pressure of deuterium, thereby allowing the hydrogen absorbing alloy to absorb the deuterium and tritium;

e) maintaining the pressure in the system at a level lower than the equilibrium desorption pressure of deuterium and higher than that of tritium so as to allow the hydrogen absorbing alloy to release the deuterium, and then separating the released deuterium from the system; and f) maintaining the pressure in the system at a level lower than the equilibrium desorption pressure of tritium so as to allow the hydrogen absorbing alloy to release the tritium.

A third method for separating light hydrogen and a heavy hydrogen of the present invention comprises the s taps of;

a) allowing a mixed gas of light and heavy hydrogens to contact the above-mentioned hydrogen absorbing alloy at a predetermined temperature and at a pressure higher than the equilibrium absorption pressure of light hydrogen, thereby allowing the hydrogen absorbing alloy to absorb the light and heavy hydrogens;

b) maintaining the pressure in the system at a level lower than the equilibrium desorption pressure of the heavy hydrogen so as to allow the hydrogen absorbing alloy to release a first gas for a predetermined period of time, and then separating the first gas from the system, the first gas containing the light hydrogen at an increased concentration; and c) collecting a second gas subsequently released from the hydrogen absorbing alloy with the pressure kept at the same level as in step b, the second gas containing the heavy hydrogen at an increased concentration.

In a preferred embodiment, the third method further comprises the step of repeating steps a to c using a gas obtained in step b or c.

In a preferred embodiment, the heavy hydrogen in the third method is deuterium.

In a preferred embodiment, the heavy hydrogen in the third method is a mixed gas of deuterium and tritium, and the method further comprises the steps of;

d) allowing the gas obtained in step c to contact the hydrogen absorbing alloy at a predetermined temperature and at a pressure higher than the equilibrium absorption pressure of deuterium, thereby allowing the hydrogen absorbing alloy to absorb the gas;

e) maintaining the pressure in the system at a level lower than the equilibrium desorption pressure of tritium to allow the hydrogen absorbing alloy to release a first gas for a predetermined period of time, and then separating the first gas from the system, the first gas containing deuterium at an increased concentration; and f) collecting a second gas subsequently released from the hydrogen absorbing alloy with the pressure kept at the same level as in step e, the second gas containing tritium at an increased concentration.

Thus, the invention described herein makes possible the objectives of (1) providing a hydrogen absorbing alloy which can be used to effectively separate hydrogen isotopes by utilizing the differences in equilibrium absorption or desorption pressures between the respective hydrogen isotopes; (2) providing a method for separating hydrogen isotopes effectively by the use of the above-mentioned hydrogen absorbing alloy and by utilizing the differences in equilibrium absorption or desorption pressures between the respective hydrogen isotopes; and (3) providing a method for separating hydrogen isotopes effectively by the use of the above-mentioned hydrogen absorbing alloy and by utilizing the differences in desorption rates between the respective hydrogen isotopes at a lower temperature than that of the prior art.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

A hydrogen absorbing alloy according to the present invention is of the following formula I:

$$AB\alpha \qquad (I)$$

wherein A is at least one selected from the group consisting of Ti, Zr and Hf; B is at least one selected from the group consisting of Mn, V, Fe, Ni, Cr, CO, Cu, zn, Al, Si, Nb, Me, W, Mg, Ca, Y, Ta, Pd, Ag, Au, Cd, In, Sn, Bi, La, Ce, Mm (misch metal), Pr, Nd, Th and Sm; and $\alpha$ is a number in the range of 1.5 to 2.5.

This type of alloy is an intermetallic compound the alloy phases of which are substantially Laves phases. The crystal structure of the alloy is of the C14-type hexagonal system with a lattice constant a of 4.75 to 5.05 Å and a lattice constant c of 7.85 to 8.25 Å. Examples of this alloy includes $TiMn_{1.5}$, $ZrMn_{2.2}$, $HfMn_{2.4}$, $HfCr_{1.8}$, $TiMn_{1.0}La_{0.6}$, $TiMn_{1.3}Co_{0.3}$, $TiMn_{1.2}Ni_{0.2}$, $ZrMn_{2.0}Cr_{0.1}$, $Ti_{0.8}Zr_{0.2}Mn_{1.4}Cr_{0.6}$, $Ti_{0.5}Zr_{0.5}Cr_{1.2}Ni_{0.8}$, $Zr_{0.8}Hf_{0.2}V_{1.5}Mo_{0.5}$, $ZrCr_{1.2}Co_{0.6}Cu_{0.4}$, $Ti_{0.8}Zr_{0.2}Mn_{1.2}Cr_{0.5}Cu_{0.3}$, $Ti_{0.5}Zr_{0.5}Mn_{1.0}Ca_{0.2}Fe_{1.1}$, $Ti_{0.2}Zr_{0.8}Cr_{1.2}V_{0.2}Mm_{0.7}$, $Ti_{0.6}Zr_{0.4}V_{1.0}Cr_{0.8}Sn_{0.2}$, $ZrMn_{1.4}Zn_{0.2}Nb_{0.4}Al_{0.1}$, and the like. Among these alloys, those including Ti or Zr are preferable, and those of the Ti-Mn system are more preferable.

Figure 1:
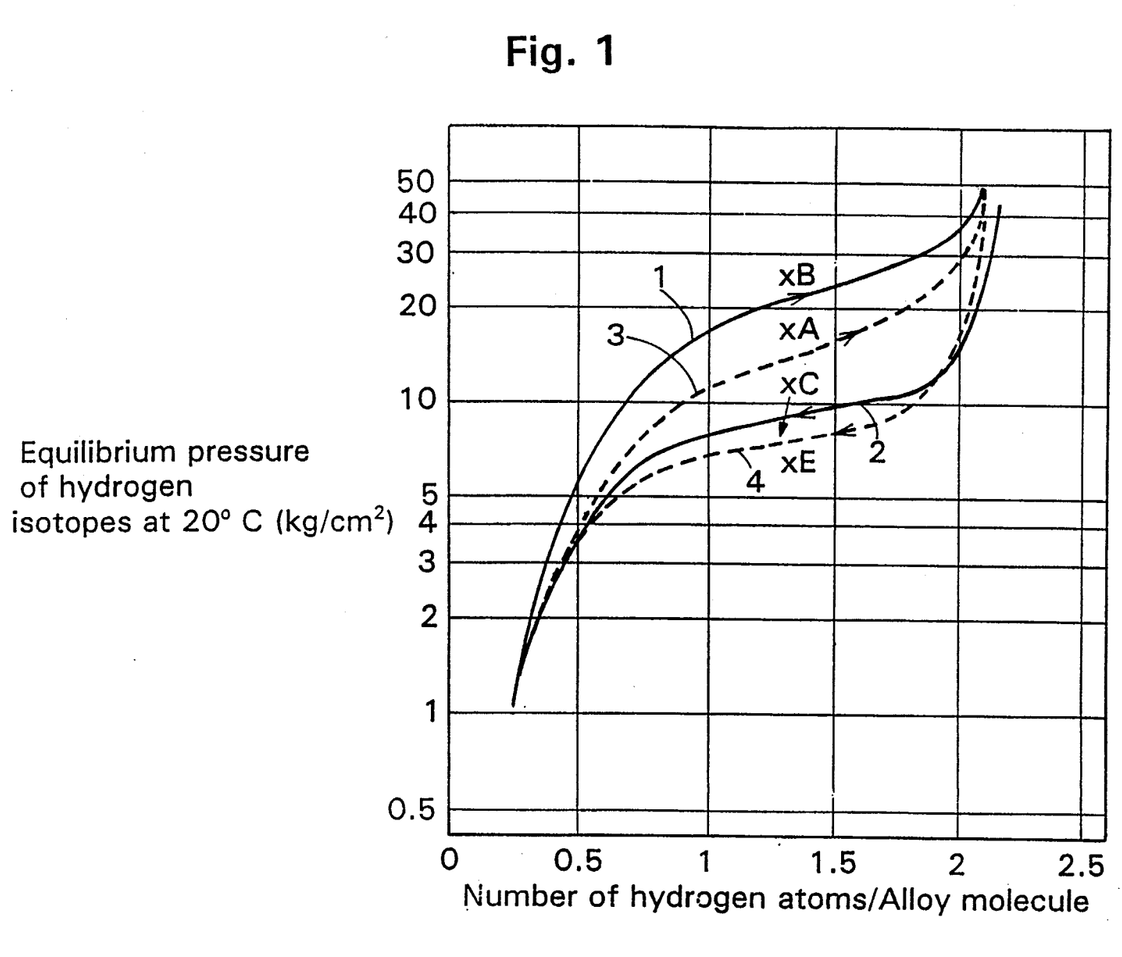
FIG. 1 shows pressure-composition isotherm diagrams of light hydrogen and deuterium when they are absorbed by and desorbed from a hydrogen absorbing alloy of the formula $TiMn_{1.5}$ of the present invention at a temperature of 20° C.

An alloy such as described above can absorb and release a large amount of hydrogen ($H_2$, $D_2$ or $T_2$) in accordance with changes in pressure at a temperature of 100° C. or less. In the absorption and desorption of hydrogen isotopes using the alloy, $H_2$, $D_2$ and $T_2$ are different from one another in equilibrium absorption pressures and equilibrium desorption pressures; the equilibrium absorption and desorption pressures of are the highest, those of $D_2$ are the second highest, and those of $T_2$ are the third at a predetermined temperature. The rates at which the absorbed $H_2$, $D_2$ and $T_2$ are desorbed from the alloy are also different from one another; the desorption rate of $H_2$ is the highest, that of $D_2$ is the second highest, and that of $T_2$ is the third. For example, as shown in FIG. 1, when $M_2$ gas is allowed to contact a hydrogen absorbing alloy of the present invention at a predetermined temperature (20° C. in FIG. 1) with a gradual increase in the pressure from 1 $kg/cm^2$ to 50 $kg/cm^2$, the hydrogen absorbing alloy absorbs $H_2$ as indicated by the curve 1. When the pressure is gradually decreased after the absorption of $H_2$, the absorbed $H_2$ is desorbed from the hydrogen absorbing alloy as indicated by the curve 2. Similarly, with the use of a $D_2$ gas, the hydrogen absorbing alloy absorbs $D_2$ as indicated by the curve 3, and releases the absorbed $D_2$ as indicated by the curve 4.

Using such a hydrogen absorbing alloy, the separation of hydrogen isotopes can be effectively carried out by the methods of the present invention, as will be described below.

In a first method for the separation of hydrogen isotopes according to the present invention, for example, a mixed gas of light hydrogen and deuterium is first brought into contact with the hydrogen absorbing alloy at a predetermined pressure, so as to allow the hydrogen absorbing alloy to absorb the gas. For example, when the pressure in the system is kept at the level indicated by the point A in FIG. 1, deuterium is absorbed by the hydrogen absorbing alloy but light hydrogen remains outside the alloy in the system. The light hydrogen is then separated from the system, after which the system pressure is set at the level indicated by the point E in FIG. 1. This results in that the deuterium previously absorbed by the hydrogen absorbing alloy is desorbed therefrom. For the separation of the three hydrogen isotopes present as a mixture, in the same manner as described above, deuterium and tritium are first absorbed by the hydrogen absorbing alloy and then the remaining light hydrogen is separated from the system. Thereafter, the absorbed deuterium and tritium are desorbed from the hydrogen absorbing alloy. The deuterium and tritium thus separated from the light hydrogen are then separated from each other in the same manner as described above. Alternatively, tritium is first separated from deuterium and light hydrogen, followed by the separation of the deuterium from the light hydrogen. The purity of a desired hydrogen isotope gas separated from the mixed gas by the above procedure can be further improved by being subjected to the same separation procedure again.

In a second method according to the present invention, for example, a mixed gas of light hydrogen and deuterium is first brought into contact with the hydrogen absorbing alloy at a predetermined pressure, so as to allow the hydrogen absorbing alloy to absorb the gas. For example, when the pressure in the system is kept at the level indicated by the point B in FIG. 1, deuterium and light hydrogen are both absorbed by the hydrogen absorbing alloy. Then, the system pressure is maintained at the level indicated by the point C in FIG. 1, and the absorbed light hydrogen is desorbed from the hydrogen absorbing alloy with the deuterium still stored therein. The thus desorbed light hydrogen is taken out of the system. Thereafter, the system pressure is set at the level indicated by the point E to allow The deuterium to be desorbed from the hydrogen absorbing alloy. For the separation of the three hydrogen isotopes present as a mixture, in the same manner as described above, first, light hydrogen, deuterium and tritium are all absorbed by the hydrogen absorbing alloy. Thereafter, the system pressure is successively changed so as to allow the three hydrogen isotopes to be desorbed one after another from the hydrogen absorbing alloy, so that each of the hydrogen isotopes thus desorbed is collected. The purity of a desired isotope gas separated from the mixed gas by the above procedure can be further improved by being subjected to the same separation procedure again.

As can be seen from FIG. 1, the difference in equilibrium absorption pressures between light hydrogen and deuterium is greater than that in equilibrium desorption pressures between the two hydrogen isotopes at the same temperature. Similarly, the difference in equilibrium absorption pressures between deuterium and tritium is greater than that in equilibrium desorption pressures between the two hydrogen isotopes at the same temperature. Thus, the first method described above can attain higher efficiency in the separation of hydrogen isotopes as compared with the second method.

Figure 2:
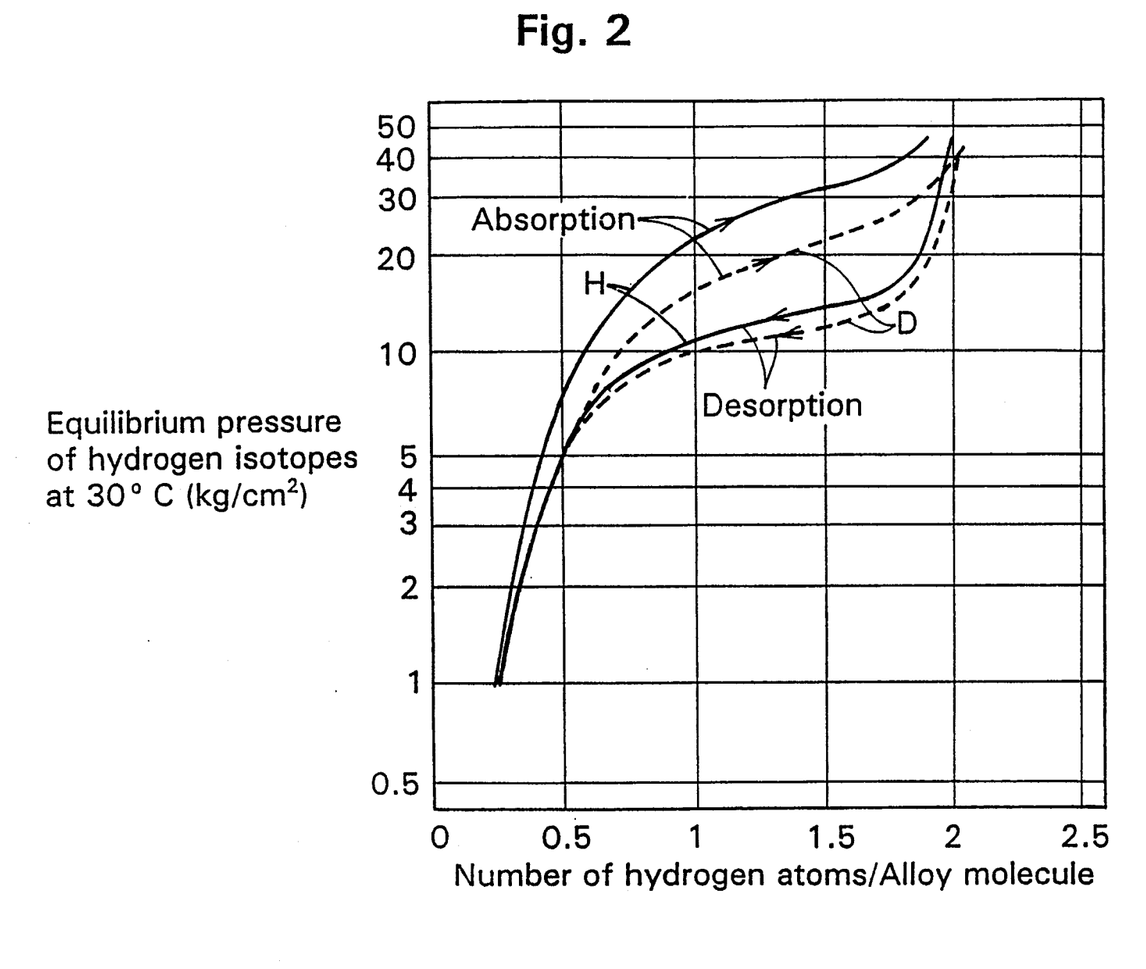
FIG. 2 shows pressure-composition isotherm diagrams of light hydrogen and deuterium when they are absorbed by and desorbed from the hydrogen absorbing alloy of the formula $TiMn_{1.5}$ of the present invention at a temperature of 30° C.

FIG. 2 is a graph showing the absorption and desorption of light hydrogen and deuterium performed at 30° C. By the comparison of FIG. 2 with FIG. 1, it is found that the efficiency in isotope separation becomes higher with a decrease in temperature. In general, separation processes in the first and second methods are performed at temperatures of 50° C. or lower, preferably at about 0° C.

In the first and second method, separation can be preferably carried out by utilizing the differences in equilibrium ratio in plateau regions between the respective hydrogen isotopes, but the difference in equilibrium pressures at other regions between the hydrogen isotopes can also be utilized.

Figure 4:
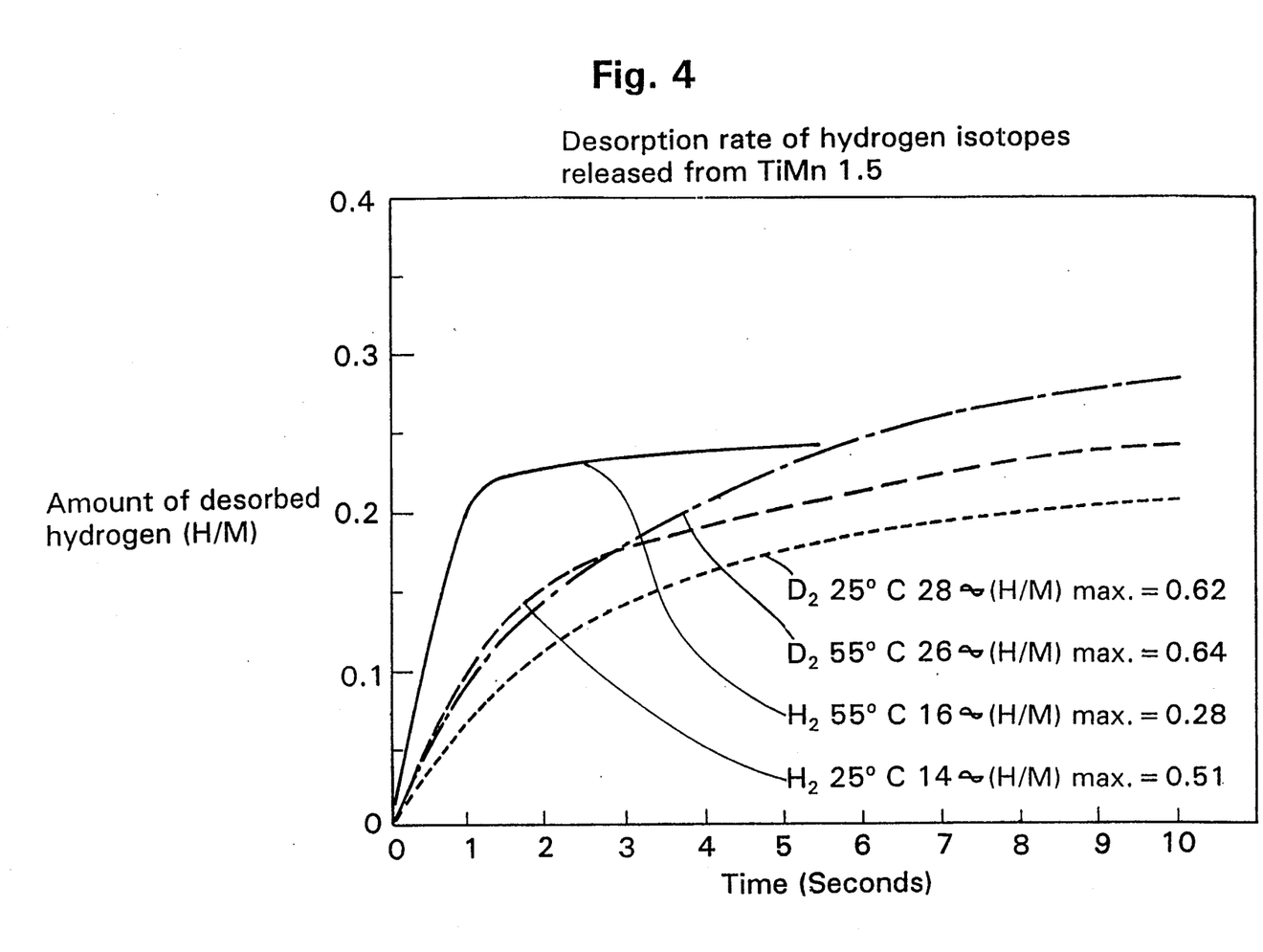
FIG. 4 is a graph showing the desorption rates of light hydrogen and deuterium when they are desorbed from the hydrogen absorbing alloy of the formula $TiMn_{1.5}$ of the present invention at a predetermined temperature.

In a third method according to the present invention, for example, a mixed gas of light hydrogen and deuterium is first allowed to contact the hydrogen absorbing alloy at a predetermined temperature and at a pressure higher than the equilibrium absorption pressures of both light hydrogen and deuterium (e.g., the pressure level indicated by the point B in FIG. 1), thereby allowing both the hydrogen isotopes to be absorbed by the alloy. Thereafter, the pressure is reduced to a level below the equilibrium desorption pressure of deuterium (e.g., the pressure level indicated by the point E in FIG. 1). As a result, the absorbed hydrogen isotopes start to be desorbed from the alloy. As shown in FIG. 4, the desorption rate of deuterium is different from that of light hydrogen. Thus, the gas first desorbed from the alloy for a predetermined period of time is collected as a first gas, after which the gas subsequently desorbed from the alloy for another predetermined period of time is collected as a second gas. The first gas contains light hydrogen at a high concentration, while the second gas contains deuterium at a high concentration. Using each gas thus collected, the procedure described above is repeated to obtain a light hydrogen or deuterium gas of higher purity. The separation of the three hydrogen isotopes present as a mixed gas is carried out in a similar manner. That is, all the hydrogen isotopes are first absorbed by the hydrogen absorbing alloy, after which the pressure is set at a level below the equilibrium desorption pressure of tritium. As a result, due to the differences in desorption rates between the three hydrogen isotopes, three kinds of gases respectively containing light hydrogen, deuterium and tritium at a high concentration are desorbed one after another from the alloy and accordingly can be collected in turn.

EXAMPLES

Examples of the present invention will be described below by reference to the accompanying drawings.

Example 1

First, Ti and Mn were weighed at a predetermined molar ratio, and then melted together using an argon arc melting furnace or melted together under vacuum or in an inert-gas atmosphere using a high frequency heating furnace, thereby forming an alloy. The thus obtained alloy was then heat-treated at 1100° C. for 20 hours to attain homogeneity therein, resulting in a C14-type alloy of the formula $TiMn_{1.5}$.

The alloy thus prepared is a hydrogen absorbing alloy of the present invention which can absorb and release hydrogen isotopes. Using this hydrogen absorbing alloy, the absorption and desorption of light hydrogen were carried out as follows: First, the alloy was allowed to contact light hydrogen at a temperature of 20° C. while the pressure in the system was gradually increased from the level of atmospheric pressure to 50 $kg/cm^2$ thereby causing the alloy to absorb the light hydrogen. Next, the pressure was gradually decreased to allow the hydrogen absorbing alloy to release the absorbed light hydrogen.

Using the same type of hydrogen absorbing alloy, the absorption and desorption of deuterium were also carried out in the same manner as described above.

The results of the above absorption and desorption processes are shown by the pressure-composition isotherm diagrams in FIG. 1. The pressure-composition isotherm diagrams in FIG. 1 indicate the relationship between the hydrogen equilibrium pressure and the amount of hydrogen stored in the alloy (i.e., the number of hydrogen atoms per alloy molecule), with respect to the absorption and desorption of light hydrogen and deuterium. The absorption of light hydrogen is indicated by the curve 1, while the desorption of light hydrogen is indicated by the curve 2. Similarly, the absorption and desorption of deuterium are indicated by the curves 3 and 4, respectively. As can be seen from FIG. 1, the curve for the absorption of light hydrogen or deuterium (1 or 3) is shifted from that for the desorption of light hydrogen or deuterium (2 or 4), i.e., the absorption and desorption curves exhibit hysteresis. Also as shown in FIG. 1, light hydrogen and deuterium, which are different in atomic weight, give different curves.

The alloy used in this example was at least 99.9% pure, and the light hydrogen and deuterium used were at least 99.99% and at least 99.7% pure, respectively.

The points indicated by A, B, C and E in FIG. 1 are typical equilibrium pressure levels which are suitable for the separation of light hydrogen and deuterium, considering from the pressure-composition isotherm diagrams of light hydrogen and deuterium. As can be seen from FIG. 1, each curve has a substantially horizontal region where the equilibrium absorption (or desorption) pressure remains constant even with an increase (or decrease) in the amount of hydrogen stored in the alloy. This horizontal region is referred to as a "plateau region". In the plateau regions, the pressure level A is lower than the equilibrium absorption pressure of light hydrogen and higher than that of deuterium, and the pressure level B is higher than the equilibrium absorption pressure of light hydrogen. At the pressure level A, light hydrogen is not absorbed by the hydrogen absorbing alloy, while deuterium is absorbed by the alloy. At the pressure level B, both light hydrogen and deuterium are absorbed by the hydrogen absorbing alloy. Similarly, in the plateau regions, the pressure level C is lower than the equilibrium desorption pressure of light hydrogen and higher than that of deuterium, and the pressure level Z is lower than the equilibrium desorption pressure of deuterium. At the pressure level C, light hydrogen is desorbed from the hydrogen absorbing alloy, while deuterium is not desorbed therefrom. At the pressure level E, both light hydrogen and deuterium are desorbed from the alloy.

For convenience, the reference to the above-described "plateau region" can herein be omitted from the phrases regarding the pressure levels to be employed for the separation of hydrogen isotopes according to the present invention, e.g., phrases such as "a pressure higher (or lower) than the equilibrium absorption (or desorption) pressure of a certain hydrogen isotope" are employed.

The above-described pressure levels A, B, C and E can be used for the separation of deuterium from light hydrogen as follows: First, with the hydrogen absorbing alloy kept at a temperature of 20° C., a light hydrogen gas containing deuterium is brought into contact with the alloy at the pressure of level A. As a result, since the pressure level A is higher than the equilibrium absorption pressure of deuterium, the deuterium in the gas is readily absorbed by the alloy. On the other hand, the light hydrogen in the gas is not absorbed by the alloy because the pressure level A is lower than the equilibrium absorption pressure of light hydrogen, i.e., level A is out of the pressure range which enables the absorption of light hydrogen. Thus, the light hydrogen remains in the gas which has been left outside the alloy. This gas is purged from the system, after which the pressure around the alloy is set at level E or lower, thereby allowing the deuterium stored in the alloy to be desorbed therefrom. In this way, a gas containing deuterium at a high concentration can be obtained. Using this gas, the above procedure can be repeated in order to attain a higher deuterium concentration.

FIG. 2 shows pressure-composition isotherm diagrams indicating the absorption and desorption of light hydrogen and deuterium. The absorption and desorption indicated by FIG. 2 were performed in the same manner as those indicated by FIG. 1 described above, except that the temperature was kept at 30° C. instead of 20° C.

As described above, a pressure-composition isotherm diagram such as shown in FIGS. 1 and 2 has a plateau region which is substantially horizontal. Time equilibrium absorption or desorption pressure corresponding to the plateau region is referred to as an "equilibrium absorption or desorption plateau pressure". As can be seen from FIG. 1, when the absorption and desorption processes were performed at 20° C. using the alloy of the formula $TiMn_{1.5}$, the difference in equilibrium absorption plateau pressures between M and D was about 8 kg/cm$^2$, while the difference in equilibrium desorption plateau pressures between H and D was about 2 kg/cm$^2$. Other C14-type Laves phase alloys of the present invention all exhibit similar absorption and desorption characteristics, i.e., the difference in equilibrium absorption plateau pressures between H and D is greater than that in desorption plateau pressures between H and D. Therefore, it is preferred that a heavy hydrogen be separated from light hydrogen through the absorption process. The separation of hydrogen isotopes using the absorption process is at least about four times more efficient than that using the desorption process.

For convenience, when referring to the "difference(s) in equilibrium absorption (or desorption) plateau pressures" between two or three hydrogen isotopes, the term "plateau" can herein be omitted.

Example 2

A mixed gas of light hydrogen and deuterium was fed into a vessel in which the hydrogen absorbing alloy obtained in Example 1 was placed, so that the mixed gas was allowed to contact the hydrogen absorbing alloy. The temperature inside the vessel was kept at 20° C., and the pressure in the vessel was maintained at level B in FIG. 1, which was higher than the equilibrium absorption pressure of light hydrogen. The light hydrogen and deuterium were both absorbed by the hydrogen absorbing alloy. Next, the pressure was set at level C which was lower than the equilibrium desorption pressure of light hydrogen and higher than that of deuterium, thereby causing the light hydrogen stored in the alloy to be desorbed therefrom. Accordingly, the deuterium remained in the alloy. Then, the light hydrogen desorbed from the alloy was purged from the vessel, after which the pressure in the vessel was reduced to level E or lower, thereby allowing the deuterium stored in the alloy to be desorbed therefrom. In this way, deuterium was effectively separated from light hydrogen and obtained at a high concentration. Using this gas, the above procedure was repeated, so that the deuterium concentration was further increased.

Example 3

Figure 3:
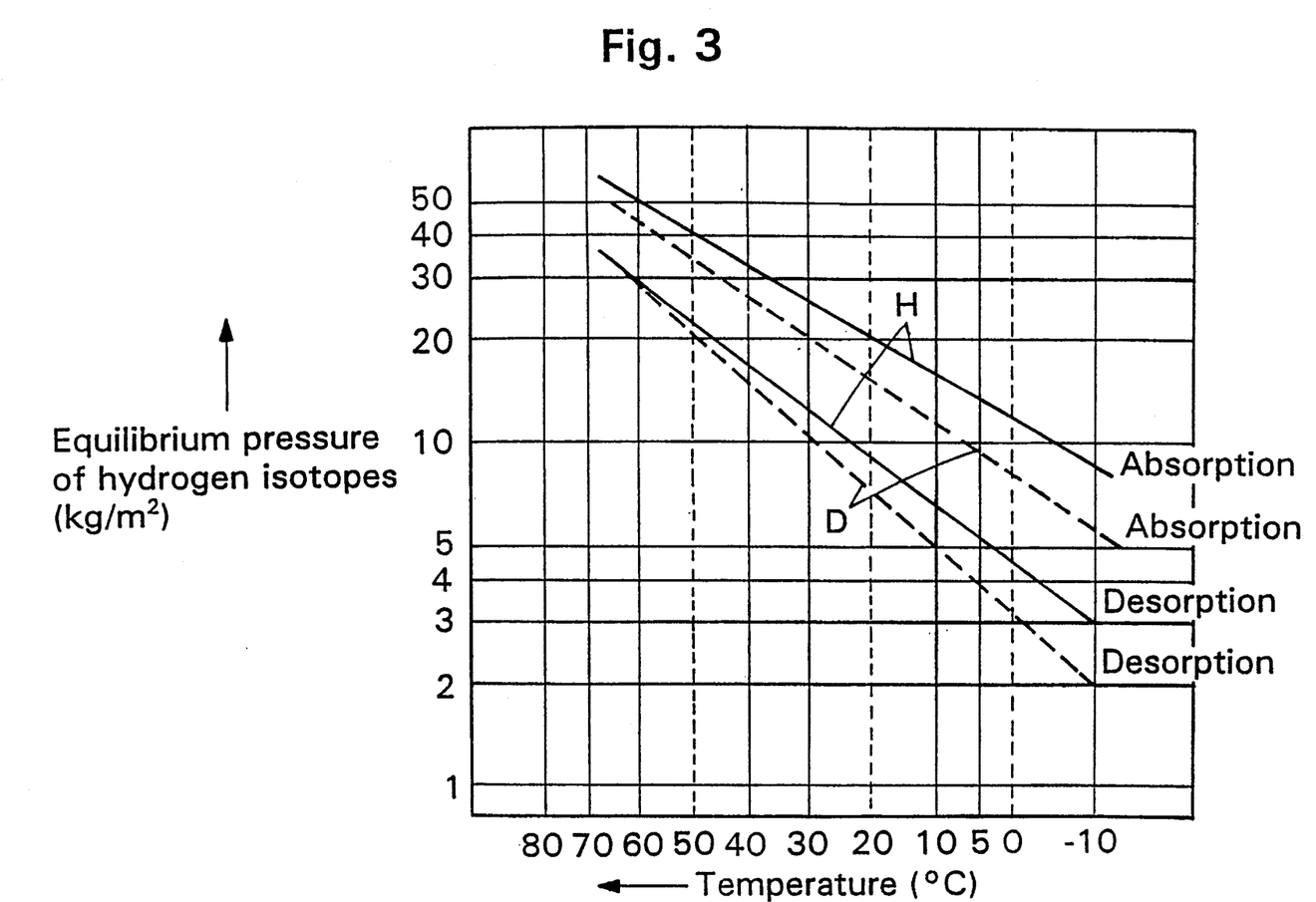
FIG. 3 is a graph showing the relationships between the temperature and the equilibrium absorption pressure and between the temperature and the equilibrium desorption pressure, with respect to light hydrogen and deuterium when they are absorbed by and desorbed from the hydrogen absorbing alloy of the formula $TiMn_{1.5}$ of the present invention.

By the use of the hydrogen absorbing alloy of the formula $TiMn_{1.5}$ obtained in Example 1, light hydrogen and deuterium were subjected to absorption and desorption processes in the same manner as in Example 1 at different temperatures, thereby providing pressure-composition isotherms of the two hydrogen isotopes at the different temperatures. From each pressure-composition isotherm, the equilibrium absorption or desorption plateau pressure was determined. The relationships between the thus obtained equilibrium absorption and desorption plateau pressures and the corresponding temperatures are shown as absorption and desorption lines in FIG. 3. The solid lines show the absorption and desorption of light hydrogen, while the broken lines show the absorption and desorption of deuterium. These absorption and desorption lines indicate the efficiency in the separation of deuterium from light hydrogen; high separation efficiency can be attained at temperatures where the gap between the absorption (or desorption) lines of light hydrogen and deuterium is large. The changes in partial molar enthalpy calculated from FIG. 3 were: $-17.8$ kJ/mol $H_2$ in light hydrogen and $-21.3$ kJ/mol $D_2$ in deuterium during the absorption; and $-23.3$ kJ/mol $H_2$ in light hydrogen and $-28.7$ kJ/mol $D_2$ in deuterium during the desorption, is found that the absorption (or desorption) lines of light hydrogen and deuterium cross at a high temperature. In FIG. 3, as the temperature increases from the level of room temperature, the gap between the desorption lines of light hydrogen and deuterium becomes narrower, and the two lines cross at a temperature of about 60° C. Thus, when the differences in equilibrium absorption or desorption pressures between hydrogen isotopes is utilized for the separation of the hydrogen isotopes, high separation efficiency can be attained at temperatures of about 50° C. or lower.

Example 4

In this example, the separation of deuterium from light hydrogen was performed by using different hydrogen absorbing alloys, i.e., $TiMn_{1.5}$ and $ZrV_2$, and by employing different methods, i.e., the first and second methods according to the present invention. Accordingly, in this example, four different separation processes were performed with different combinations of the alloy and the method. In all the separation processes, the temperature was kept at 0° C. As described above, in the processes using the first method, the pressure was set at level A during the absorption and then set at level E during the desorption, thereby affecting the separation of the two hydrogen isotopes through the absorption process. In the processes using the second method, also as described above, the pressure was set at the level B during the absorption and then set at level C during the desorption, thereby effecting the separation of the two hydrogen isotopes through the desorption process.

In all the separation processes thus performed, substantially the same separation efficiencies were attained. In each process, a deuterium concentration of 0.5% in an initial light hydrogen-deuterium mixture was increased to a concentration of about 10% by the single process. The deuterium concentration thus obtained was ten times higher than that was obtained by the separation process performed at 50° C.

FIGS. 1, 2 and 3 described in the above examples are the graphs obtained by using about 100% pure hydrogen isotope gases. When a mixed gas of different hydrogen isotopes is subjected to an absorption or desorption process for the separation of the hydrogen isotopes, the partial pressures of the respective hydrogen isotope gases are set at predetermined absorption or desorption pressure levels obtained from the corresponding pressure-composition isotherm diagrams shown in FIGS. 1 and 2.

Other hydrogen absorbing alloys of the present invention which were of the same type as $TiMn_{1.5}$, for example, alloys of the formulas $ZrMn_2$, $ZrV_2$, $ZrMo_2$ and $ZrFe_2$ were also used for the same separation processes as those performed in this example. The results were substantially the same as those obtained by the use of $TiMn_{1.5}$. Especially, the alloys containing V provided excellent separation efficiencies.

The pressure-composition isotherm diagrams of tritium are, if shown in FIGS. 1 and 2, shifted downward (toward lower pressures) from those of deuterium. Tritium can be separated from the other hydrogen isotopes by the same separation processes as in the above examples.

Hydrogen absorbing alloys as listed in Table 1 were produced. These alloys were allowed to absorb and release light hydrogen, deuterium and tritium at a temperature of 20° C. In the absorption and desorption processes, the equilibrium absorption and desorption pressures of the three hydrogen isotopes were measured when the number of hydrogen atoms per alloy molecule became 1.3. From the equilibrium pressures thus measured, the differences in equilibrium absorption and desorption pressures between the three hydrogen isotopes were calculated. The results are shown in Table 1 below.

TABLE 1

| Alloy | $\Delta Pa_1$ | $\Delta Pa_2$ | $\Delta Pd_1$ | $\Delta Pd_2$ |
|---|---|---|---|---|
| $TiMn_{1.5}$ | 8.0 | 6.3 | 2.1 | 1.5 |
| $ZrMn_{2.2}$ | 4.4 | 2.7 | 1.5 | 1.3 |
| $HfMn_{2.4}$ | 3.7 | 2.2 | 1.4 | 1.1 |
| $RfCr_{1.8}$ | 4.6 | 2.8 | 1.9 | 1.5 |
| $TiMn_{1.0}La_{0.6}$ | 7.8 | 6.2 | 2.4 | 1.7 |
| $TiMn_{1.3}CO_{0.3}$ | 8.3 | 6.8 | 2.6 | 1.8 |
| $TiMn_{1.2}Ni_{0.2}$ | 7.6 | 5.8 | 2.5 | 1.4 |
| $ZrMn_{2.0}Cr_{0.1}$ | 5.3 | 4.3 | 1.8 | 1.0 |
| $Ti_{0.2}Zr_{0.2}Mn_{1.4}Cr_{0.6}$ | 9.6 | 8.4 | 2.8 | 2.0 |
| $Ti_{0.5}Zr_{0.5}Cr_{1.2}Ni_{0.8}$ | 6.0 | 4.8 | 2.0 | 1.6 |
| $Zr_{0.8}Hf_{0.2}V_{1.5}Mo_{0.5}$ | 7.7 | 5.6 | 2.1 | 1.3 |
| $ZrCr_{1.2}Co_{0.6}Cu_{0.4}$ | 4.8 | 2.9 | 1.7 | 1.5 |
| $Ti_{0.2}Zr_{0.2}Mn_{1.2}Cr_{0.5}Cu_{0.3}$ | 9.2 | 7.6 | 3.1 | 2.2 |
| $Ti_{0.5}Zr_{0.5}Mn_{1.0}Ca_{0.2}Fe_{1.1}$ | 7.4 | 5.5 | 1.7 | 1.4 |
| $Ti_{0.2}Zr_{0.8}Cr_{1.2}V_{0.2}Mn_{0.7}$ | 4.3 | 2.4 | 1.3 | 1.1 |
| $Ti_{0.6}Zr_{0.4}V_{1.0}Cr_{0.8}Sn_{0.2}$ | 7.6 | 5.3 | 2.2 | 1.6 |
| $ZrMn_{1.4}Zn_{0.2}Nb_{0.4}Al_{0.1}$ | 5.5 | 4.7 | 1.7 | 1.2 |

$\Delta Pa_1$: the difference in absorption pressures between light hydrogen (H) and deuterium (D) when the number of hydrogen atoms per alloy molecule is 1.3
$\Delta Pd_1$: the difference in desorption pressures between light hydrogen (H) and deuterium (D) when the number of hydrogen atoms per alloy molecule is 1.3
$\Delta Pa_2$: the difference in absorption pressures between deuterium (D) and tritium (T) when the number of hydrogen atoms per alloy molecule is 1.3
$\Delta Pd_2$: the difference in desorption pressures between deuterium (D) and tritium (T) when the number of hydrogen atoms per alloy molecule is 1.3

Reference Example

In the same manner as in Example 1, hydrogen absorbing alloy of the formula $TiMn_{1.5}$ was prepared. Samples of the alloy were allowed to absorb light hydrogen at two different predetermined temperatures (10° C. and 20° C). The absorption of deuterium was also performed at 10° C. and at 20° C. as separate absorption processes. In this way, four different absorption processes were carried out with different combinations of the temperature and the hydrogen isotope to be absorbed. In each absorption process, the initial pressure was set to be higher than the equilibrium absorption pressure of light hydrogen or deuterium by 0.2 in logarithm $[\log(P_i/P_e)=0.2]$ ($P_i$ is the initial pressure and $P_e$ is the equilibrium pressure). The absorption process was completed at a pressure higher than the equilibrium absorption pressure by 0.1 in logarithm $[\log(P_i/P_e)=0.1]$. After each absorption process, the pressure was set at a level of the equilibrium absorption plateau pressure of light hydrogen or deuterium. The system is then opened to allow the pressure to rapidly decrease to the level of atmospheric pressure (1 $kg/cm^2$), after which the system was closed again, causing the pressure to increase. The period of time required for the pressure to increase to the equilibrium desorption plateau pressure was measured. This period represents the desorption rate of light hydrogen or deuterium. The content of hydrogen (light hydrogen or deuterium) in the alloy was also measured when the equilibrium desorption plateau pressure was attained.

As described above, in this example, four different experiments were performed in which the above four different absorption processes were followed by the respective desorption processes. The absorption and desorption cycle in each experiment was repeatedly carried out. As a result, the desorption rate of light hydrogen or deuterium gradually increased and became substantially constant after several cycles were completed.

The alloys used in this example were at least 99.9% pure, the light hydrogen and deuterium used were at least 99.99% and at least 99.7% pure, respectively.

Figure 5:
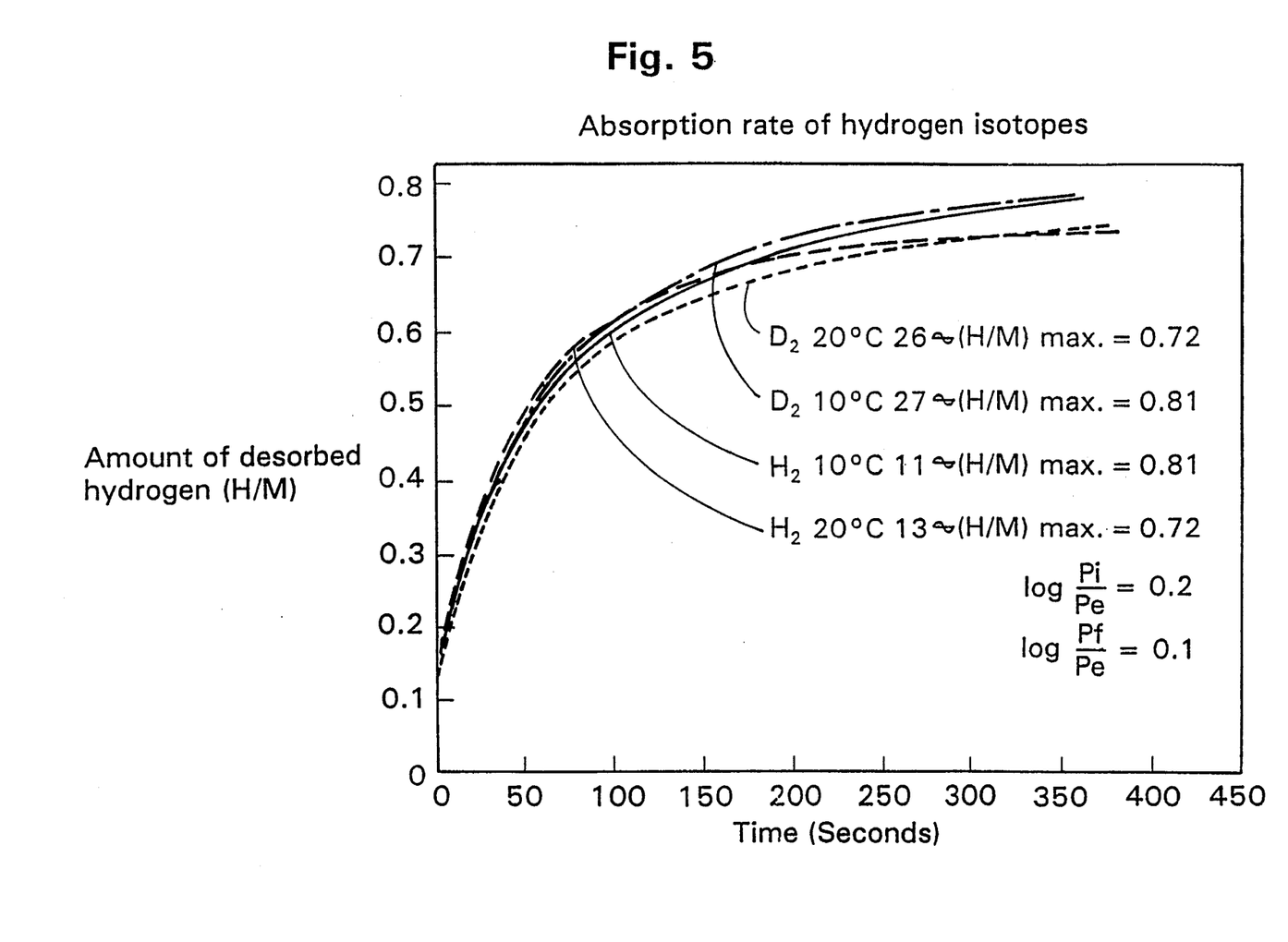
FIG. 5 is a graph showing the absorption rates of light hydrogen and deuterium when they are absorbed by the hydrogen absorbing alloy of the formula $TiMn_{1.5}$ of the present invention at a predetermined temperature.

FIG. 5 shows the absorption rates of light hydrogen and deuterium determined from the four experiments described above. The number of absorption and desorption cycles and the maximum amount of absorbed hydrogen $(H/M)_{max}$ in each experiment are also shown in FIG. 5. The curves in FIG. 5 were obtained by the values measured at the final absorption and desorption cycle of each experiment. As can be seen from FIG. 5, although the absorption rate of deuterium is slightly lower than that of light hydrogen, there is no significant difference between them at the same temperature. Therefore, when the separation of deuterium from light hydrogen is to be performed using the difference in absorption rates between them, the conditions for the separation process require extreme accuracy to attain satisfactory results. This separation process also has a disadvantage in that the absorption of light hydrogen or deuterium requires a long period of time.

However, the alloy ($TiMn_{1.5}$) used in this reference example absorbed the hydrogen gas at such a rate so as to attain a H/M ratio (the number of hydrogen atoms per alloy molecule) of 0.5 in about 1 minute (60 seconds). This indicates that $TiMn_{1.5}$ is excellent in the hydrogen absorption rate, as compared with other alloys such as those of the AB type (e.g., TiFe) and those of the $AB_5$ type (e.g., $LaNi_5$).

Example 6

In the same manner as in Example 1, hydrogen absorbing alloy of the formula $TiMn_{1.5}$ was prepared. Samples of the alloy were allowed to absorb a mixed gas of light hydrogen and deuterium (in a ratio of 1:1) at two different predetermined temperatures (25° C. and 55° C.). In each absorption process (performed at 25° C. or 55° C.), the pressure was kept higher than the equilibrium absorption pressure of light hydrogen, thereby allowing each alloy to absorb the light hydrogen and deuterium. The absorption was continued until the alloy was saturated with the mixed gas. Thereafter, at the same temperature as in the absorption, each alloy containing the mixed gas therein was allowed to release a gas for a predetermined period of time at a pressure lower than the equilibrium desorption pressure of deuterium. The thus desorbed gas was allowed to flow into a vessel capable of being sealed. The gas collected in the vessel was a light hydrogen gas containing light hydrogen at a concentration much higher than the light hydrogen concentration in the initial mixed gas; in this example, the light hydrogen gas contained 60% or more light hydrogen. On the other hand, the mixed gas remaining in the alloy contained deuterium at a high concentration. This remaining gas was subsequently desorbed from the alloy for another predetermined period of time, so that a gas containing deuterium at an increased concentration was obtained.

The results of this example can be well explained with reference to FIG. 4. FIG. 4 shows the desorption rates of light hydrogen and deuterium when they are separately subjected to desorption processes using the hydrogen absorbing alloy of the formula $TiMn_{1.5}$ of the present invention. In the desorption processes indicated by FIG. 4, two different temperatures, i.e., 25° C. and 55° C. are employed. The light hydrogen and deuterium gases used are both about 100% pure.

As can be seen from FIG. 4, in the gas desorbed from the alloy at 55° C. for 2 seconds from the start of the desorption, the hydrogen/deuterium (H/D) ratio is about 0.23/0.14=1.64. This indicates that when the H/D ratio is 1:1 in the mixed gas previously absorbed by the hydrogen absorbing alloy, the light hydrogen concentration in a gas desorbed from the alloy for the first 2 seconds is 1.64 times higher than that in the initial mixed gas. More specifically, when the previously absorbed mixed gas of light hydrogen and deuterium is desorbed from $TiMn_{1.5}$ at 55° C. for 2 seconds, only part of the deuterium stored in the $TiMn_{1.5}$ alloy (H/M=0.14) is desorbed therefrom, and the other part is left in the alloy. On the other hand, during the same period, light hydrogen is desorbed from the alloy in a H/M ratio of 0.23. The amount of light hydrogen left in the alloy is much smaller than that of the remaining deuterium.

In this way, the gas desorbed from the alloy for the first 2 seconds is collected as a gas containing light hydrogen at a high concentration. Then, the gas subsequently desorbed from the alloy is collected as a gas containing deuterium at a high concentration. The gas containing light hydrogen or deuterium at such a high concentration thus obtained can be subjected to the same procedure again in order to further increase the light hydrogen or deuterium concentration. The repetition of the separation procedure can provide a desired hydrogen isotope gas of high purity.

In general, C14-type Laves phase alloys of the present invention all exhibit separation efficiencies as high as those obtained in this example. With any of the alloys of the present invention, it is preferable that the separation of hydrogen isotopes be carried out by utilizing the difference in desorption rates between the respective hydrogen isotopes. This is because the separation of hydrogen isotopes cannot be performed at a high efficiency by utilizing the difference in absorption rates between the respective hydrogen isotopes, as described in Reference Example. In the separation of deuterium from light hydrogen, the separation efficiency attained by the use of the difference in desorption rates was at least about 60% lighter than that attained by the use of the difference in absorption rates.

Example 7

A mixed gas of light hydrogen and deuterium was allowed to be absorbed by the hydrogen absorbing alloy of the formula $TiMn_{1.5}$ and then allowed to be desorbed therefrom in the same manner as in Example 6, except that the temperature was kept at 10° C. during the absorption and then kept at a high level (about 55° C.) higher than room temperature (20° C.) during the desorption. In the desorption, %he hydrogen absorbing alloy was allowed to release a gas for 2 seconds. The thus desorbed gas contained light hydrogen at a high concentration. This gas was then purged from the system, after which the alloy was allowed to release a gas for another 4 seconds, and the gas thus desorbed was collected. The deuterium concentration in the thus collected gas was at least 70% higher than that in the initial mixed gas. Using this gas containing such a high deuterium concentration, the above procedure was carried out again, so that the deuterium concentration was further increased.

Example 8

Using two different hydrogen absorbing alloys of the present invention, i.e., $ZrMn_{2.4}Fe_{0.4}$ and $ZrV_2$, the separation of deuterium from light hydrogen was performed at a temperature of 60° C. by utilizing the difference in desorption rates between the two hydrogen isotopes. In this example, different desorption periods (i.e., 3 and 10 seconds) were employed for the collection of gases first desorbed from the alloys. Accordingly, in this example, four different separation processes were performed with different combinations of the alloy and the desorption period. In each separation process, the alloy ($ZrMn_{2.4}Fe_{0.4}$ or $ZrV_2$) was first allowed to release a gas for 3 or 10 seconds, so that the thus desorbed gas was collected. Then, the gas subsequently desorbed from the alloy was collected as a gas containing a high deuterium concentration. As a result, the separation processes employing the desorption period of 3 seconds attained higher efficiency as compared with those employing the desorption period of 10 seconds. With the desorption period of 3 seconds, a deuterium concentration of about 2% in the initial gas was increased to a concentration of about 5% by the single separation process.

FIGS. 4 and 5 described in Reference Example and Examples 6 and 7 show the graphs obtained by the use of about 100% pure light hydrogen and deuterium gases in the absorption or desorption processes. When a mixed gas of light hydrogen and deuterium is to be subjected to separation processes, the separation conditions such as temperatures and desorption periods can be employed according to the Figures.

Many other hydrogen absorbing alloys according to the present invention, e.g., $ZrMn_2$, $ZrMo_2$ and $ZrFe_2$, were also used for the separation processes described above. The results were similar to those obtained in the above processes. Especially, alloys containing Mn or V provided excellent separation efficiencies.

The curves for desorption rates of tritium are, when shown in FIG. 4, slower than those of deuterium. Tritium can be separated from the other hydrogen isotopes and obtained at a high concentration, by the same separation processes as in the above examples.

Example 9

Hydrogen absorbing alloys as listed in Table 2 were prepared. Each of the alloys was allowed to absorb a mixed gas of light hydrogen and deuterium (in a ratio of 1:1) at 55° C. and at a pressure of 60 kg/cm² for 50 seconds. Then, the system was opened, thereby decreasing the pressure. Immediately after the pressure reached the level of atmospheric pressure, the system was closed again, thereby allowing the alloy to release a gas for 2 seconds. The composition of the thus desorbed gas was examined. This experiment was also performed by the use of a mixed gas of deuterium and tritium (in a ratio of 1:1). The results are shown in Table 2 below.

TABLE 2

| Alloy | Absorption rate (weight ratio) | | Desorption rate (weight ratio) | |
|---|---|---|---|---|
| | H/D | D/T | H/D | D/T |
| $TiMn_{1.5}$ | 1.2 | 1.1 | 1.5 | 1.2 |
| $ZrMn_{2.2}$ | 1.3 | 1.1 | 1.8 | 1.3 |
| $HfMn_{2.4}$ | 1.15 | 1.05 | 1.7 | 1.2 |
| $HfCr_{1.8}$ | 1.15 | 1.1 | 1.7 | 1.25 |
| $TiMn_{1.0}La_{0.6}$ | 1.1 | 1.0 | 1.6 | 1.1 |
| $TiMn_{1.3}Co_{0.3}$ | 1.2 | 1.1 | 1.6 | 1.2 |
| $TiMn_{1.2}Ni_{0.2}$ | 1.25 | 1.2 | 1.4 | 1.2 |
| $ZrMn_{2.0}Cr_{0.1}$ | 1.15 | 1.1 | 1.5 | 1.3 |
| $Ti_{0.8}Zr_{0.2}Mn_{1.4}Cr_{0.6}$ | 1.3 | 1.2 | 1.9 | 1.2 |
| $Ti_{0.5}Zr_{0.5}Cr_{1.2}Ni_{0.8}$ | 1.2 | 1.1 | 1.4 | 1.1 |
| $Zr_{0.8}Hf_{0.2}V_{1.5}Mo_{0.5}$ | 1.2 | 1.15 | 1.7 | 1.2 |
| $ZrCr_{1.2}Co_{0.6}Cu_{0.4}$ | 1.15 | 1.05 | 1.9 | 1.1 |
| $Ti_{0.8}Zr_{0.2}Mn_{1.2}Cr_{0.5}Cu_{0.3}$ | 1.3 | 1.2 | 1.9 | 1.3 |
| $Ti_{0.5}Zr_{0.6}Mn_{1.0}Ca_{0.2}Fe_{1.1}$ | 1.2 | 1.1 | 1.5 | 1.2 |

TABLE 2-continued

| Alloy | Absorption rate (weight ratio) | | Desorption rate (weight ratio) | |
|---|---|---|---|---|
| | H/D | D/T | H/D | D/T |
| $Ti_{0.2}Zr_{0.8}Cr_{1.2}V_{0.2}Mn_{0.7}$ | 1.3 | 1.2 | 1.6 | 1.3 |
| $Ti_{0.6}Zr_{0.4}V_{1.0}Cr_{0.8}Sn_{0.2}$ | 1.25 | 1.2 | 1.8 | 1.3 |
| $ZrMn_{1.4}Zn_{0.2}Nb_{0.4}Al_{0.1}$ | 1.35 | 1.2 | 1.7 | 1.4 |

As described in all the above examples, a hydrogen absorbing alloy of the present invention, which has Laves phases with a C14-type crystal structure, can be used to effectively separate hydrogen isotopes by the methods of the present invention, i.e., by utilizing the differences in equilibrium absorption or desorption pressures between the respective hydrogen isotopes, or by utilizing the differences in desorption rates between the hydrogen isotopes. Furthermore, according to the present invention, deuterium or tritium can be effectively separated from light hydrogen at low cost without causing pollution. The methods of the present invention can also provide an isotope separation apparatus which is inexpensive and easy to operate.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for separating light hydrogen and a heavy hydrogen, comprising the steps of:

a) allowing a mixed gas of light and heavy hydrogens to contact a hydrogen absorbing alloy comprising Laves phases with a C14 hexagonal crystal structure at a predetermined temperature and at a pressure lower than the equilibrium absorption pressure of light hydrogen and higher than that of the heavy hydrogen, thereby allowing the hydrogen absorbing alloy to absorb the heavy hydrogen, said hydrogen absorbing alloy being of the following formula I:

$$AB_\alpha \qquad (I)$$

wherein A is at least one selected from the group consisting of Ti, Zr, and Hf; B is at least one selected from the group consisting of Mn,. V, Fe, Ni, Cr, Co, Cur Zn, Al, Si, Nb, Mo, W, Mg, Ca, Y, Ta, Pd, Ag, Au, Cd, In, Sn, Bi, La, Ce, Mm (misch metal), Pr, Nd, Th, and Sm; α is a number in the range of 1.5 to 2.5; and said hydrogen absorbing alloy having a lattice constant a of 4.75 to 5.05 Å and a lattice constant c of 7.85 to 8.25 Å;

b) separating the light hydrogen remaining outside the hydrogen absorbing alloy from the system; and c) maintaining the pressure in the system at a level lower than the equilibrium desorption pressure of the heavy hydrogen to allow the hydrogen absorbing alloy to release the heavy hydrogen.

2. A method according to claim 1, further comprising the step of repeating steps a to c using the gas obtained in step b or c.

3. A method according to claim 1, wherein the heavy hydrogen is deuterium.

4. A method according to claim 1, wherein the heavy hydrogen is a mixed gas of deuterium and tritium, the method further comprising the steps of:
   d) allowing the mixed gas of deuterium and tritium obtained in step c to contact the hydrogen absorbing alloy of claim 1 at a predetermined temperature and at a pressure lower than the equilibrium absorption pressure of deuterium and higher than that of tritium, thereby causing the hydrogen absorbing alloy to absorb the tritium;
   e) separating the deuterium remaining outside the hydrogen absorbing alloy from the system; and
   f) maintaining the pressure in the system at a level lower than the equilibrium desorption pressure of tritium to allow the hydrogen absorbing alloy to release the tritium.

5. A method according to claim 1, wherein the predetermined temperature is 50° C. or less.

6. A method according to claim 1, wherein the predetermined temperature is about 0° C.

7. A method for separating light hydrogen and a heavy hydrogen, comprising the steps of;
   a) allowing a mixed gas of light and heavy hydrogens to contact a hydrogen absorbing alloy comprising Laves phases with a C14 hexagonal crystal structure at a predetermined temperature and at a pressure higher than the equilibrium absorption pressure of light hydrogen, thereby allowing the hydrogen absorbing alloy to absorb the light and heavy hydrogens, said hydrogen absorbing alloy being of the followinq formula I:

$$AB_\alpha \qquad (I)$$

wherein A is at least one selected from the group consisting of Ti, Zr, and Hf; B is at least one selected form the group consisting of Mn, V, Fe, Ni, Cr, Co, Cu, Zn, Al, Si, Nb, Mo, W, Mg, Ca, Y, Ta, Pd, Ag, Au, Cd, In, Sn, Bi, La, Ce, Mm (misch metal), Pr, Nd, Th, and Sm; $\alpha$ is a number in the range of 1.5 to 2.5; and said hydrogen absorbing alloy having a lattice constant a of 4.75 to 5.05 Å and a lattice constant c of 7.85 to 8.25 Å;
   b) maintaining the pressure in the system at a level lower than the equilibrium desorption pressure of light hydrogen and higher than that of the heavy hydrogen to cause the hydrogen absorbing alloy to release the light hydrogen, and then separating the released light hydrogen from the system; and
   c) maintaining the pressure in the system at a level lower than the equilibrium desorption pressure of the heavy hydrogen to allow the hydrogen absorbing alloy to release the heavy hydrogen.

8. A method according to claim 7, further comprising the step of repeating steps a to c using a gas obtained in step b or c.

9. A method according to claim 7, wherein the heavy hydrogen is deuterium.

10. A method according to claim 7, wherein the heavy hydrogen is a mixed gas of deuterium and tritium, the method further comprising the steps of:
    d) allowing the mixed gas of deuterium and tritium obtained in step c to contact the hydrogen absorbing alloy of claim 1 at a predetermined temperature and at a pressure higher than the equilibrium absorption pressure of deuterium, thereby allowing the hydrogen absorbing alloy to absorb the deuterium and tritium;
    e) maintaining the pressure in the system at a level lower than the equilibrium desorption pressure of deuterium and higher than that of tritium to allow the hydrogen absorbing alloy to release the deuterium, and then separating the released deuterium from the system; and
    f) maintaining the pressure in the system at a level lower than the equilibrium desorption pressure of tritium to allow the hydrogen absorbing alloy to release the tritium.

11. A method according to claim 7, wherein the predetermined temperature is 50° C. or less.

12. A method according to claim 7, wherein the predetermined temperature is about 0° C.

13. A method for separating light hydrogen and a heavy hydrogen, comprising the steps of:
    a) allowing a mixed gas of light and heavy hydrogens to contact a hydrogen absorbing alloy comprising Laves phases with a C14 hexagonal crystal structure at a predetermined temperature and at a pressure higher than the equilibrium absorption pressure of light hydrogen, thereby allowing the hydrogen absorbing alloy to absorb the light and heavy hydrogens, said hydrogen absorbing alloy being of the followinq formula I:

$$AB_\alpha \qquad (I)$$

wherein A is at least one selected from the qroup consisting of Ti, Zr, and Hf; B is at least one selected form the group consisting of Mn, V, Fe, Ni, Cr, Co, Cu, Zn, Al, Si, Nb, Mo, W, Mg, Ca, Y, Ta, Pd, Ag, Au, Cd, In, Sn, Bi, La, Ce, Mm (misch metal), Pr, Nd, Th, and Sm; $\alpha$ is a number in the range of 1.5 to 2.5; and said hydrogen absorbing alloy having a lattice constant a of 4.75 to 5.05 Å and a lattice constant c of 7.85 to 8.25 Å;
    b) maintaining the pressure in the system at a level lower than the equilibrium desorption pressure of the heavy hydrogen to allow the hydrogen absorbing alloy to release a first gas for a predetermined period of time, and then separating the first gas from the system, the first gas containing the light hydrogen at an increased concentration; and
    c) collecting a second gas subsequently released from the hydrogen absorbing alloy with the pressure kept at the same level as in step b, the second gas containing the heavy hydrogen at an increased concentration.

14. A method according to claim 13, further comprising the step of repeating steps a to c using the gas obtained in step b or c.

15. A method according to claim 13, wherein the heavy hydrogen is deuterium.

16. A method according to claim 13, wherein the heavy hydrogen is a mixed gas of deuterium and tritium, the method further comprising the steps of;
    d) allowing the gas obtained in step c to contact the hydrogen absorbing alloy of claim 1 at a predetermined temperature and at a pressure higher than the equilibrium absorption pressure of deuterium, thereby allowing the hydrogen absorbing alloy to absorb the gas;
    e) maintaining the pressure in the system at a level lower than the equilibrium desorption pressure of tritium to allow the hydrogen absorbing alloy to release a first gas for a predetermined period of time, and then separating the first gas from the system, the first gas containing deuterium at an increased concentration; and f) collecting a second gas subsequently released from the hydrogen absorbing alloy with the pressure kept at the same level as in step e, the second gas containing tritium at an increased concentration.

17. A method according to claim 13, wherein the predetermined temperature is at least 20° C.

18. A method according to claim 13, wherein the predetermined temperature is about 55° C.

19. A method according to claim 1, wherein A in formula I is Ti or Zr.

20. A method according to claim 1, wherein A and B in formula I are Ti and Mn, respectively.

21. A method according to claim 7, wherein A in formula I is Ti or Zr.

22. A method according to claim 7, wherein A and B in formula I are Ti and Mn, respectively.

23. A method according to claim 13, wherein A in formula I is Ti or Zr.

24. A method according to claim 13, wherein A and B in formula I are Ti and Mn, respectively.

* * * * *